United States Patent
Zhu et al.

(10) Patent No.: US 11,317,447 B2
(45) Date of Patent: Apr. 26, 2022

(54) CONFIGURATION OF A PACKET DATA NETWORK CONNECTION

(71) Applicant: Telefonaktiebolaget LM Ericsson (publ), Stockholm (SE)

(72) Inventors: Jinyin Zhu, Shanghai (CN); Xiaoming Li, Shanghai (CN); Zhiwei Qu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/756,051

(22) PCT Filed: Oct. 20, 2017

(86) PCT No.: PCT/CN2017/107103
§ 371 (c)(1),
(2) Date: Apr. 14, 2020

(87) PCT Pub. No.: WO2019/075748
PCT Pub. Date: Apr. 25, 2019

(65) Prior Publication Data
US 2020/0314922 A1    Oct. 1, 2020

(51) Int. Cl.
*H04W 4/70* (2018.01)
*H04W 76/10* (2018.01)

(52) U.S. Cl.
CPC ................ *H04W 76/10* (2018.02)

(58) Field of Classification Search
CPC ............... H04W 76/10; H04W 4/70
See application file for complete search history.

(56) References Cited

U.S. PATENT DOCUMENTS

| | | | | |
|---|---|---|---|---|
| 2012/0093086 A1* | 4/2012 | Yin | .......... | H04L 69/16 370/328 |
| 2014/0016614 A1* | 1/2014 | Velev | .......... | H04W 76/38 370/331 |
| 2017/0208506 A1* | 7/2017 | Wang | .......... | H04W 64/00 |
| 2019/0141169 A1* | 5/2019 | Ni | .......... | H04L 69/329 |

FOREIGN PATENT DOCUMENTS

| | | |
|---|---|---|
| CN | 101772106 A | 7/2010 |
| CN | 103857062 A | 6/2014 |
| EP | 2448192 A1 | 5/2012 |
| EP | 3018945 A1 | 5/2016 |

(Continued)

OTHER PUBLICATIONS

Unknown, Author, "Discussion on enabling to switch from CP to UP CIoT EPS optimization", 3GPP TSG-CT WG1 ad-hoc meeting on IoT C1A-16xxxx Sophia Antipolis (France), Apr. 25-27 20216, pp. 1-8.

(Continued)

*Primary Examiner* — Joseph E Dean, Jr.
(74) *Attorney, Agent, or Firm* — Christopher & Weisberg, P.A.

(57) ABSTRACT

A method for communications is proposed. The method may comprise transmit a request for a packet data network connection of the terminal device to a network node. The method may further comprise receiving a response to the request from the network node. The response may indicate whether user plane setup is needed for data transfer on the packet data network connection.

22 Claims, 9 Drawing Sheets

(56) References Cited

FOREIGN PATENT DOCUMENTS

| EP | 3413510 A1 | 12/2018 |
|---|---|---|
| WO | 2012136291 A2 | 10/2012 |
| WO | 2017133297 A1 | 8/2017 |
| WO | 2017141749 A1 | 8/2017 |

OTHER PUBLICATIONS

Unknown, Author, "Interaction between CP & UP solution", SA WG2 Meeting S2#112 S2-153925, Anaheim, USA, Nov. 16-20, 2015, pp. 1-3.

Unknown, Author, "Simultaneous support for CP and UP optimisation", SA WG2 Meeting #115 S2-163058, Nanjing, P.R. China, May 23-27, 2016, pp. 1-33.

Unknown, Author, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", 3GPP TS 29.274 V14.4.0, Jun. 2017, pp. 1-369.

Unknown, Author, "3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 14)", 3GPP TS 29.272 V14.4.0, Jun. 2017, pp. 1-163.

Unknown, Author, "3rd Generation Partnership Project; Technical Specification Group Core Network and Terminals; Non-Access-Stratum (NAS) protocol for Evolved Packet System (EPS); Stage 3 (Release 14)", 3GPP TS 24.301 V14.4.0, Jun. 2017, pp. 1-486.

Unknown, Author, "3rd Generation Partnership Project; Technical Specification Group Core Network and Terminals; Policy and Charging Control (PCC); Reference points (Release 14)", 3GPP TS 29.212 V14.4.0, Jun. 2017, pp. 1-277.

Unknown, Author, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.4.0, pp. 1-386, Jun. 2017.

* cited by examiner

CONFIGURATION OF A PACKET DATA NETWORK CONNECTION

FIELD OF THE INVENTION

The present disclosure generally relates to communications, and more specifically, to wireless communications.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and radio technologies such as an Internet of things (IoT) or a cellular Internet of things (CIoT), the optimization of communication functionalities in a network may facilitate data delivery and enhance system performance. For example, some functionalities for CIoT optimization have been defined by the $3^{rd}$ generation partnership project (3GPP) and one of them is the control plane CIoT evolved packet system (EPS) optimization such as data over non-access stratum (DoNAS). Only DoNAS can be used for data transfer on a control plane only packet data network (PDN) connection. On the other hand, some PDN connections to a certain access point name (APN) may need to support data transfer only over user plane. For example, a PDN connection to an Internet protocol multimedia subsystem (IMS) APN may not be suitable for DoNAS. Thus, it may be desirable to improve the PDN connection configuration to support different types of data transfer.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

In a wireless communication network, a PDN connection may be created to provide PDN connectivity for a terminal device. A control plane only PDN connection may be identified by a control plane only indication. Only DoNAS can be used for data transfer on the control plane only PDN connection. For a PDN without a control plane only indication, both DoNAS and user plane data transfer may be applicable if supported by a terminal device. However, there may be some operator service APNs that need to be supported over user plane, for example, an IMS APN or an APN used for equipment management. Correspondingly, data or payload on a PDN connection to such APN may need to be delivered over user plane.

The present disclosure proposes a mechanism to configure a PDN connection with a user plane only indication, which may enable a terminal device and a network node to perform user plane setup effectively for data transfer of some user plane only services, so that DoNAS would not be misused and data delivery efficiency may be improved.

According to a first aspect of the present disclosure, there is provided a method implemented at a terminal device. The method may comprise transmitting a request for a PDN connection of the terminal device to a network node. The method may further comprise receiving a response to the request from the network node. The response may indicate whether user plane setup is needed for data transfer on the PDN connection.

Optionally, the method according to the first aspect of the present disclosure may further comprise performing the user plane setup, in case that the response indicates that the user plane setup is needed for the data transfer on the PDN connection, based at least in part on a user plane only indication for the PDN connection.

Optionally, the method according to the first aspect of the present disclosure may further comprise performing control plane data transfer, and in response to an event that user plane data transfer is to be scheduled on the PDN connection, switching from the control plane data transfer to the user plane data transfer.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon for use with a computer. The computer program codes may comprise code for performing any step of the method according to the first aspect of the present disclosure.

According to a fourth aspect of the present disclosure, there is provided an apparatus. The apparatus may comprise a transmitting unit and a receiving unit. In accordance with some exemplary embodiments, the transmitting unit may be operable to carry out at least the transmitting step of the method according to the first aspect of the present disclosure. The receiving unit may be operable to carry out at least the receiving step of the method according to the first aspect of the present disclosure.

In accordance with some exemplary embodiments, the request for the PDN connection may comprise a user plane only indication for the PDN connection. According to an embodiment, the user plane only indication may be configured by the terminal device.

In accordance with some exemplary embodiments, the response to the request for the PDN connection may comprise a user plane only indication for the PDN connection. According to an embodiment, the user plane only indication may be configured by at least one of the network node, a subscriber server, a session management entity and a policy function entity.

According to a fifth aspect of the present disclosure, there is provided a method implemented at a network node. The method may comprise receiving a request for a PDN connection of a terminal device. The method may further comprise generating a response to the request. The response may indicate whether user plane setup is needed for data transfer on the PDN connection.

Optionally, the method according to the fifth aspect of the present disclosure may further comprise performing the user plane setup, in case that the response indicates that the user plane setup is needed for the data transfer on the PDN connection, based at least in part on a user plane only indication for the PDN connection.

Optionally, the method according to the fifth aspect of the present disclosure may further comprise performing control plane data transfer, and in response to an event that user plane data transfer is to be scheduled on the PDN connection, switching from the control plane data transfer to the user plane data transfer.

Optionally, the method according to the fifth aspect of the present disclosure may further comprise receiving data on the PDN connection, and buffering the received data prior to switching from the control plane data transfer to the user plane data transfer.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon for use with a computer. The computer program codes may comprise code for performing any step of the method according to the fifth aspect of the present disclosure.

According to an eighth aspect of the present disclosure, there is provided an apparatus. The apparatus may comprise a receiving unit and a generating unit. In accordance with some exemplary embodiments, the receiving unit may be operable to carry out at least the receiving step of the method according to the fifth aspect of the present disclosure. The generating unit may be operable to carry out at least the generating step of the method according to the fifth aspect of the present disclosure.

In accordance with some exemplary embodiments, the request for the PDN connection may comprise a user plane only indication for the PDN connection. According to an embodiment, the user plane only indication may be configured by at least one of the terminal device, a mobility management entity and a subscriber server.

In accordance with some exemplary embodiments, the response to the request for the PDN connection may comprise a user plane only indication for the PDN connection. According to an embodiment, the user plane only indication may be configured by at least one of a mobility management entity, a subscriber server, a session management entity and a policy function entity.

According to a ninth aspect of the present disclosure, there is provided a method implemented at a network node. The method may comprise provisioning subscriber data of a terminal device. The subscriber data may comprise information indicating that user plane is needed for an APN available to the terminal device. The method may further comprise transmitting the subscriber data to another network node.

According to a tenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the ninth aspect of the present disclosure.

According to an eleventh aspect of the present disclosure, there is provided a computer-readable medium having computer program codes embodied thereon for use with a computer. The computer program codes may comprise code for performing any step of the method according to the ninth aspect of the present disclosure.

According to a twelfth aspect of the present disclosure, there is provided an apparatus. The apparatus may comprise a provisioning unit and a transmitting unit. In accordance with some exemplary embodiments, the provisioning unit may be operable to carry out at least the provisioning step of the method according to the ninth aspect of the present disclosure. The transmitting unit may be operable to carry out at least the transmitting step of the method according to the ninth aspect of the present disclosure.

According to a thirteenth aspect of the present disclosure, there is provided a method implemented at a network node. The method may comprise receiving subscriber data of a terminal device from another network node. The method may further comprise obtaining, based at least in part on the subscriber data, information indicating that user plane is needed for an APN available to the terminal device.

According to a fourteenth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the thirteenth aspect of the present disclosure.

According to a fifteenth aspect of the present disclosure, there is provided a computer-readable medium having computer program codes embodied thereon for use with a computer. The computer program codes may comprise code for performing any step of the method according to the thirteenth aspect of the present disclosure.

According to a sixteenth aspect of the present disclosure, there is provided an apparatus. The apparatus may comprise a receiving unit and an obtaining unit. In accordance with some exemplary embodiments, the receiving unit may be operable to carry out at least the receiving step of the method according to the thirteenth aspect of the present disclosure. The obtaining unit may be operable to carry out at least the obtaining step of the method according to the thirteenth aspect of the present disclosure.

In accordance with some exemplary embodiments, the APN for which the user plane is needed may be associated with one or more PDN connections. In an exemplary embodiment, the one or more PDN connections may comprise the PDN connection requested for the terminal device as described in the method according to any of the first aspect to the sixteenth aspect of the present disclosure.

In accordance with some exemplary embodiments, the PDN connection requested for the terminal device may comprise a user plane only PDN connection.

In accordance with some exemplary embodiments, the user plane only indication may be synchronized among the terminal device, the network node and one or more other network nodes involved in establishment of the PDN connection.

In accordance with some exemplary embodiments, the event that the user plane data transfer is to be scheduled on the PDN connection may trigger a downlink data notification (DDN) for requesting user plane setup.

In accordance with some exemplary embodiments, the user plane only indication for the PDN connection may be forwarded from a mobility management entity to another mobility management entity during a mobility procedure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
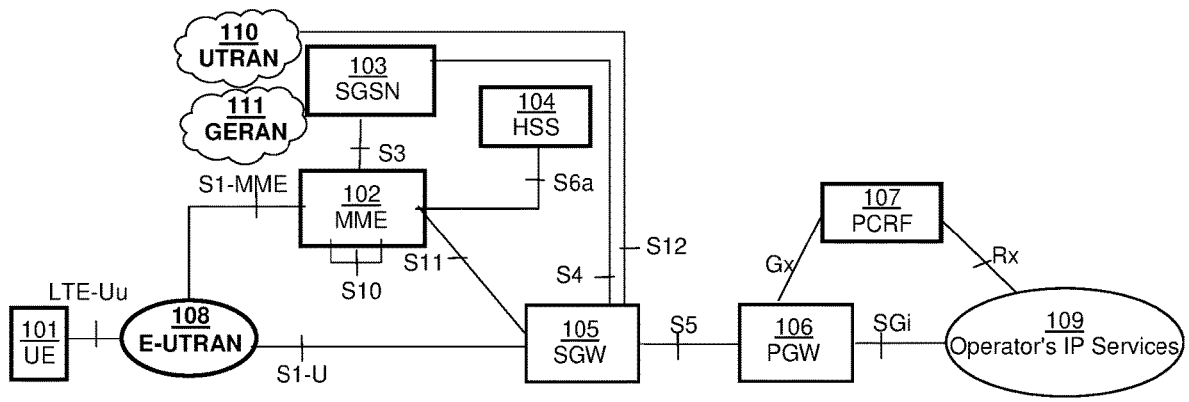
FIG. 1 is a diagram illustrating an exemplary system architecture according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "wireless communication network" may refer to a network following any suitable communication standards, such as long term evolution-advanced (LTE-A), LTE, wideband code division multiple access (WCDMA), high-speed packet access (HSPA), and so on. Furthermore, the communications between a terminal device and a network node in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

The term "network node" may refer to a network device in a wireless communication network via which a terminal device accesses to the network and receives services therefrom. The network device may refer to a base station (BS), an access point (AP), a mobile management entity (MME), a multi-cell/multicast coordination entity (MCE), a gateway, a server, a controller or any other suitable device in the wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node may comprise multi-standard radio (MSR) radio equipment such as MSR BSs, network controllers such as radio network controllers (RNCs) or base station controllers (BSCs), base transceiver stations (BTSs), transmission points, transmission nodes, MCEs, core network nodes, positioning nodes and/or the like. More generally, however, the network node may represent any suitable device (or group of devices) capable, configured, arranged, and/or operable to enable and/or provide a terminal device access to the wireless communication network or to provide some service to a terminal device that has accessed to the wireless communication network.

The term "terminal device" may refer to any end device that can access a wireless communication network and receive services therefrom. By way of example and not limitation, the terminal device may refer to a mobile terminal, a UE, or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

The terminal device may support device-to-device (D2D) communication, for example by implementing a 3GPP standard for sidelink communication, and may in this case be referred to as a D2D communication device.

As yet another specific example, in an IoT scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device.

As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring and/or reporting on its operational status or other functions associated with its operation.

As used herein, the terms "first", "second" and so forth may refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is a diagram illustrating an exemplary system architecture according to an embodiment of the present disclosure. Although the subject matter described herein may be implemented in any appropriate type of system using any suitable components, the embodiments disclosed herein are described in relation to a wireless communication system complied with the exemplary system architecture illustrated in FIG. 1. For simplicity, the system architecture of FIG. 1 only depicts some exemplary access networks such as an evolved-universal terrestrial radio access network (E-UTRAN) 108, a UTRAN 110 and a global system for mobile communication (GSM)/enhanced data rate for GSM evolution (EDGE) radio access network (GERAN) 111, and some exemplary elements such as a UE 101, a MME 102, a serving general packet radio service support node (SGSN) 103, a home subscriber server (HSS) 104, a serving gateway (SGW) 105, a PDN gateway (PGW) 106, and a policy charging rules function (PCRF) 107. In practice, a wireless communication system may further include any additional elements suitable to support communication between wireless devices or between a wireless device and another communication device, such as a landline telephone, a service provider, or any other network node or terminal device. The wireless communication system may provide communication and other types of services to one or more wireless devices to facilitate the wireless devices' access to and/or use of the services provided by, or via, the wireless communication system.

As illustrated in FIG. 1, the UE 101 may be attached to the MME 102 via a radio interface such as the LTE-Uu interface. The S1-MME interface is a control plane interface between the E-UTRAN 108 and the MME 102. The MME 102 may handle bearer and PDN connection setups for the UE 101. The LTE-Uu interface and the S1-MME interface may be used to carry NAS messages such as a PDN connectivity request, an activate default EPS bearer request, etc.

The MME 102 can communicate with the HSS 104 via the S6a interface to retrieve subscription data for the UE 101. The MME 102 also can communicate with the SGSN 103 via the S3 interface. For each PDN connection, the UE 101 may be attached to the SGW 105 and the PGW 106. The S11 interface between the MME 102 and the SGW 105 and the S5/S8 interface between the SGW 105 and the PGW 106 may be used for session management messages such as a create session request or a create session response. The S1-U interface may be used to establish a connection between the E-UTRAN 108 and SGW 105. Some messages for policy and charging control, such as a credit control request (CCR) message or a credit control answer (CCA) message, may be communicated between the PGW 106 and the PCRF 107 via the Gx interface. As further illustrated in FIG. 1, the SGi interface and the Rx interface may respectively connect the PGW 106 and the PCRF 107 to the operator's IP services 109, such as IMS, packet switching services (PSS), etc.

In accordance with an exemplary embodiment, when the UE initially attaches to the network, it may be connected to a gateway associated with an APN default for the network or with an APN specified by the UE. The connected gateway may be used for a PDN connection of the UE. By nature, whether an APN is control plane only or user plane only may need to be defined by the home operator providing the APN. For example, it may be defined in the HSS or the PGW (or possibly in the PCRF) and then the information can be propagated to other nodes such as the MME and the SGW.

For a PDN connection with a control plane only indication (also referred to as a control plane only PDN connection herein for ease of illustration), only DoNAS can be used for data transfer on this PDN connection, while for a PDN connection without a control plane only indication, both DoNAS and user plane data transfer can be used. For a service capability exposure function (SCEF) based PDN connection, it may be always control plane only. For a SGi based PDN connection, the MME may decide whether it is control plane only or not, based at least in part on the capability of the UE and the local policy of the MME. For a SGi based PDN connection without a control plane only indication, the switching between DoNAS and user plane data transfer may be performed by the UE or the MME.

However, some PDN connections to a certain APN, for example, an IMS APN, may necessarily be user plane only. The packet size for an IMS service is usually much big and whenever the service is initiated there may be quite a few session initiation protocol (SIP) messages to be exchanged between a UE and an IMS network. Furthermore, a voice call or a video call may require the dedicated bearer. These characteristics make an IMS PDN connection not suitable for DoNAS. Besides, there may be other operator service APN which also may necessarily be user plane only, for example, the APN used for equipment management such as software upgrade.

For such APN, the UE and the MME may have local configurations indicating that a PDN connection to this APN needs to use user plane data transfer, and then perform the switching from DoNAS to the user plane data transfer when there is data to be transferred on this PDN connection. However, this requires the UE and the MME to have the local awareness, which is not always feasible especially for the MME in the S8 home-routed roaming case. Furthermore, for downlink data transfer, since the data cannot be transferred to the MME on a S11-U tunnel, the SGW also may have to be aware of this, so that the SGW can trigger user plane setup when the S11-U tunnel is being used.

According to some exemplary embodiments, the present disclosure provides a mechanism to configure a PDN connection as a user plane only PDN connection, for example, by using a user plane only indication. In accordance with some exemplary embodiments, a terminal device such as UE and/or a network node such as a MME, a HSS, a PGW or a PCRF can determine an APN to be user plane only, for example, by local configurations. As such, the terminal device and/or the network node can identify the corresponding PDN connection with a user plane only indication. The user plane only indication for the PDN connection may be synchronized among all relevant nodes. For example, during PDN connection setup related to such APN, the UE, the MME and the SGW may obtain and store the user plane only indication for the PDN connection. In this way, the user plane bearer such as the evolved radio access bearer (ERAB)

and the data radio bearer may be established to deliver the data on this PDN connection.

Figure 2:
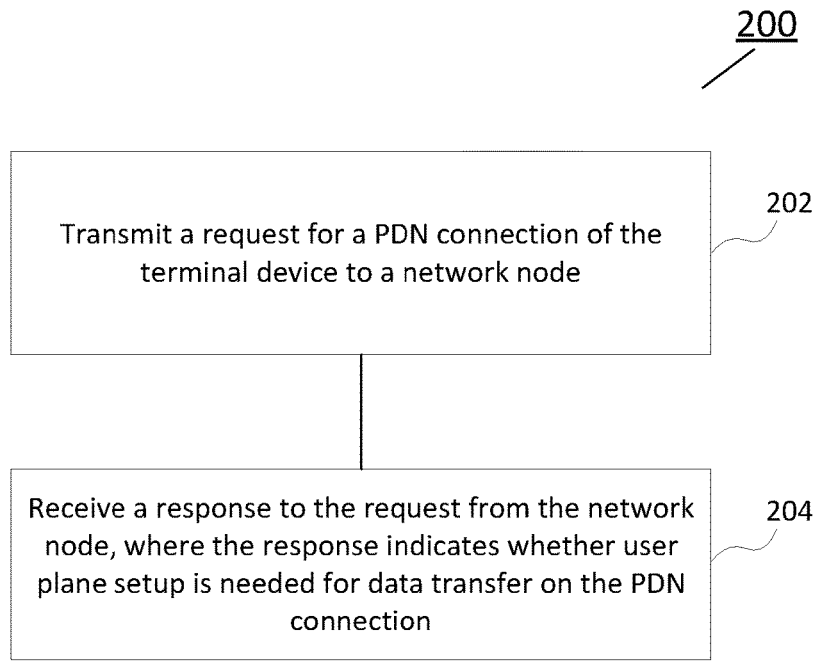
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by an apparatus implemented at a terminal device or communicatively coupled to a terminal device. In accordance with the exemplary embodiment, the terminal device may comprise a UE, a mobile station, a wireless device, a PDA, a laptop computer, a tablet computer, a smart phone, a portable device, a MTC device, or any other user device being capable of participating in communication of a wireless network.

According to the exemplary method 200 illustrated in FIG. 2, the terminal device (such as the UE 101) may transmit a request for a PDN connection of the terminal device to a network node (such as the MME 102), as shown in block 202. The request for the PDN connection of the terminal device may comprise an attach message with PDN connectivity request, a standalone PDN connectivity request, or any other suitable message related to the PDN connectivity. In an exemplary embodiment, an APN associated with the PDN connection may be determined as user plane only. Accordingly, the PDN connection may be configured as a user plane only PDN connection.

In accordance with an exemplary embodiment, the terminal device can determine the associated APN as user plane only and thus marked the PDN connection with a user plane only indication. In other words, the user plane only indication may be configured by the terminal device for the PDN connection. In this case, the request transmitted by the terminal device may comprise the user plane only indication for the PDN connection.

According to the exemplary method 200 illustrated in FIG. 2, the terminal device may receive a response to the request from the network node, as shown in block 204. The response may indicate whether user plane setup is needed for data transfer on the PDN connection. For example, the response may comprise an activate default EPS bearer context request, a request for user plane setup, or any other suitable message related to the PDN connectivity. In an exemplary embodiment, the response may indicate that the user plane setup is needed for the data transfer on the PDN connection, for example, by accepting or confirming the request comprising the user plane only indication for the PDN connection. In this case, the user plane only indication for the PDN connection configured by the terminal device may not be necessarily comprised in the response.

Alternatively, the request transmitted by the terminal device may not comprise the user plane only indication for the PDN connection. In this regard, the response may comprise the user plane only indication for the PDN connection. Thus, the response can indicate that the user plane setup is needed for the data transfer on the PDN connection by the comprised user plane only indication. The user plane only indication comprised in the response may be configured by at least one of the network node (such as the MME 102), a subscriber server (such as the HSS 104), a session management entity (such as the PGW 106) and a policy function entity (such as the PCRF 107). It will be appreciated that the user plane only indication for the PDN connection also can be specified by other network nodes which may participate in establishment of the PDN connection and/or configuration of the APN associated with the PDN connection.

In accordance with an exemplary embodiment, the user plane only indication may be synchronized among the terminal device (such as the UE 101), the network node (such as the MME 102) and one or more other network nodes (such as the HSS 104, the SGW 105, the PGW 106 and/or the PCRF 107) involved in establishment of the PDN connection.

According to an exemplary embodiment, a user plane only indication for a PDN connection of a UE may be obtained by a MME from a HSS, for example, as a part of subscriber data of the UE. It could be realized that the subscriber data of the UE may be obtained during a PDN connection establishment procedure, an attach procedure, or a subscriber data update procedure. The user plane only indication may be transmitted from the MME to a SGW and then provided to a PGW from the SGW. On the other hand, the MME may send the user plane only indication to the UE, so as to set up the user plane for data transfer on the PDN connection.

Alternatively, the user plane only indication for the PDN connection may be configured by a PGW (or by a PCRF and then provided to the PGW). The PGW can send the user plane only indication to the SGW and then to the MME. Similarly, the MME can provide the user plane only indication to the UE, so as to set up the user plane for data transfer on the PDN connection.

Optionally, the user plane only indication for the PDN connection may be configured by the UE itself and provided to the MME. Then the MME may propagate the user plane only indication to the SGW and then to the PGW. In this way, the user plane setup may be performed to support the data transfer on the PDN connection with the user plane only indication.

In accordance with an exemplary embodiment, the response received by the terminal device may indicate that the user plane setup is needed for the data transfer on the PDN connection, based at least in part on the user plane only indication for the PDN connection (which may be included in the request and/or the response, as mentioned previously). In this case, the terminal device may perform the user plane setup for the PDN connection with the user plane only indication.

In accordance with an exemplary embodiment, there may be no user plane data transfer on the PDN connection during a certain time period. The terminal device may perform control plane data transfer, for example, by using DoNAS. In response to an event that user plane data transfer is to be scheduled on the PDN connection, the terminal device may switch from the control plane data transfer to the user plane data transfer. Correspondingly, the network nodes (such as the MME and the SGW) associated with the user plane data transfer on the PDN connection may switch from the control plane data transfer to the user plane data transfer.

In accordance with an exemplary embodiment, the event may trigger a DDN for requesting user plane setup. For example, the SGW may trigger the DDN in response to the event that the user plane data transfer is to be scheduled on the PDN connection. The DDN may be triggered when the S11-U tunnel is available but not due to an error indication or service restoration. For example, a request for user plane setup may be transmitted from the SGW to the MME in the DDN. In an embodiment, the user plane may be set up for all SGi based PDN connections, according to the request for user plane setup in the DDN. As such, all data transfer may be performed over the user plane.

In accordance with an exemplary embodiment, the user plane only indication for the PDN connection may be forwarded from a MME to another MME during a mobility procedure. For example, during a handover procedure, a tracking area update (TAU) procedure or any other possible mobility procedure, an old MME may provide the user plane only indication for the PDN connection to a new MME. Then the new MME may forward the user plane only indication to a new SGW. In this way, the user plane only indication may be synchronized among various nodes related to the PDN connection.

Figure 3A:
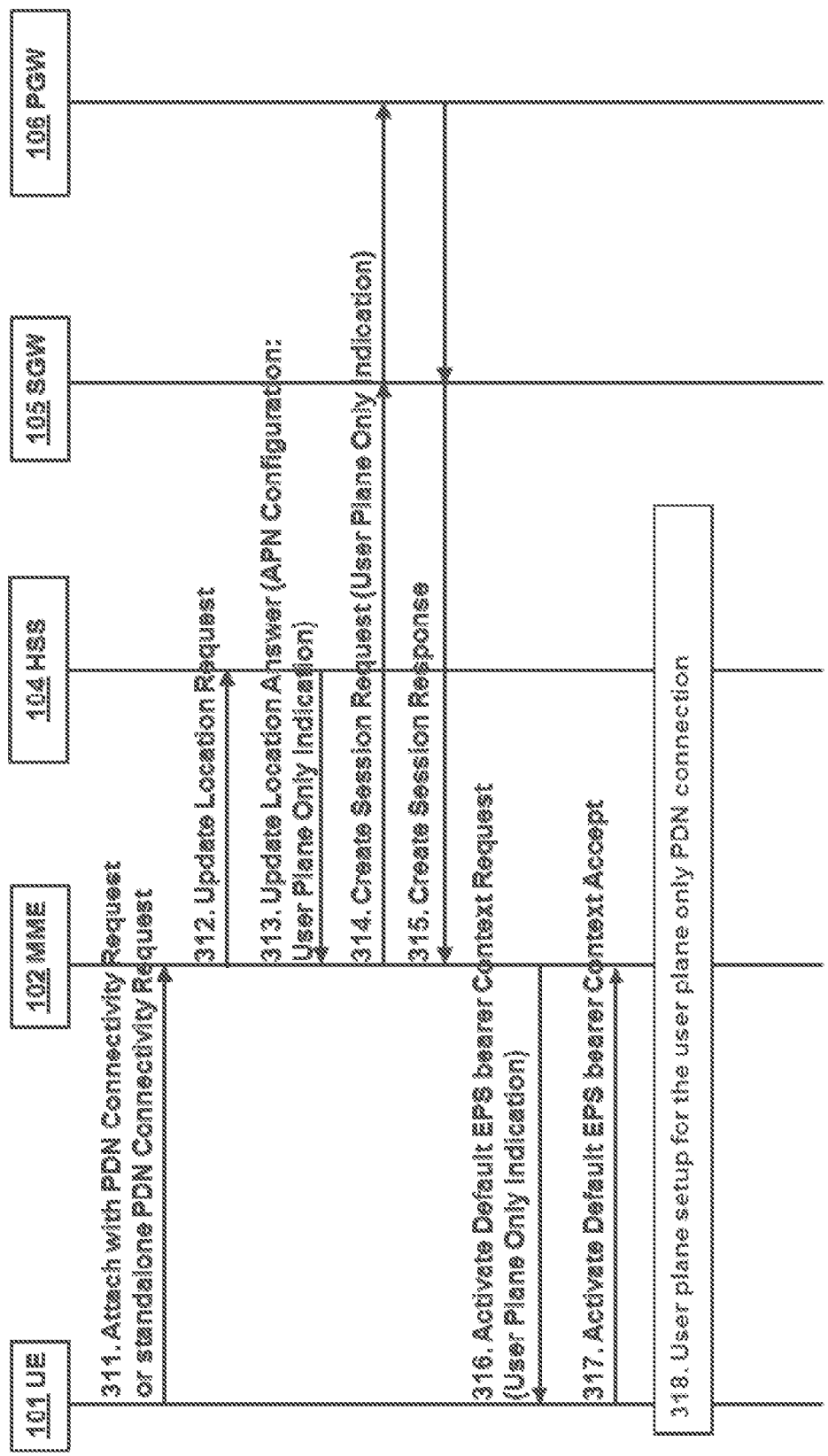
FIGS. 3A-3C are diagrams illustrating exemplary PDN connection establishment procedures according to some embodiments of the present disclosure.
Figure 3B:
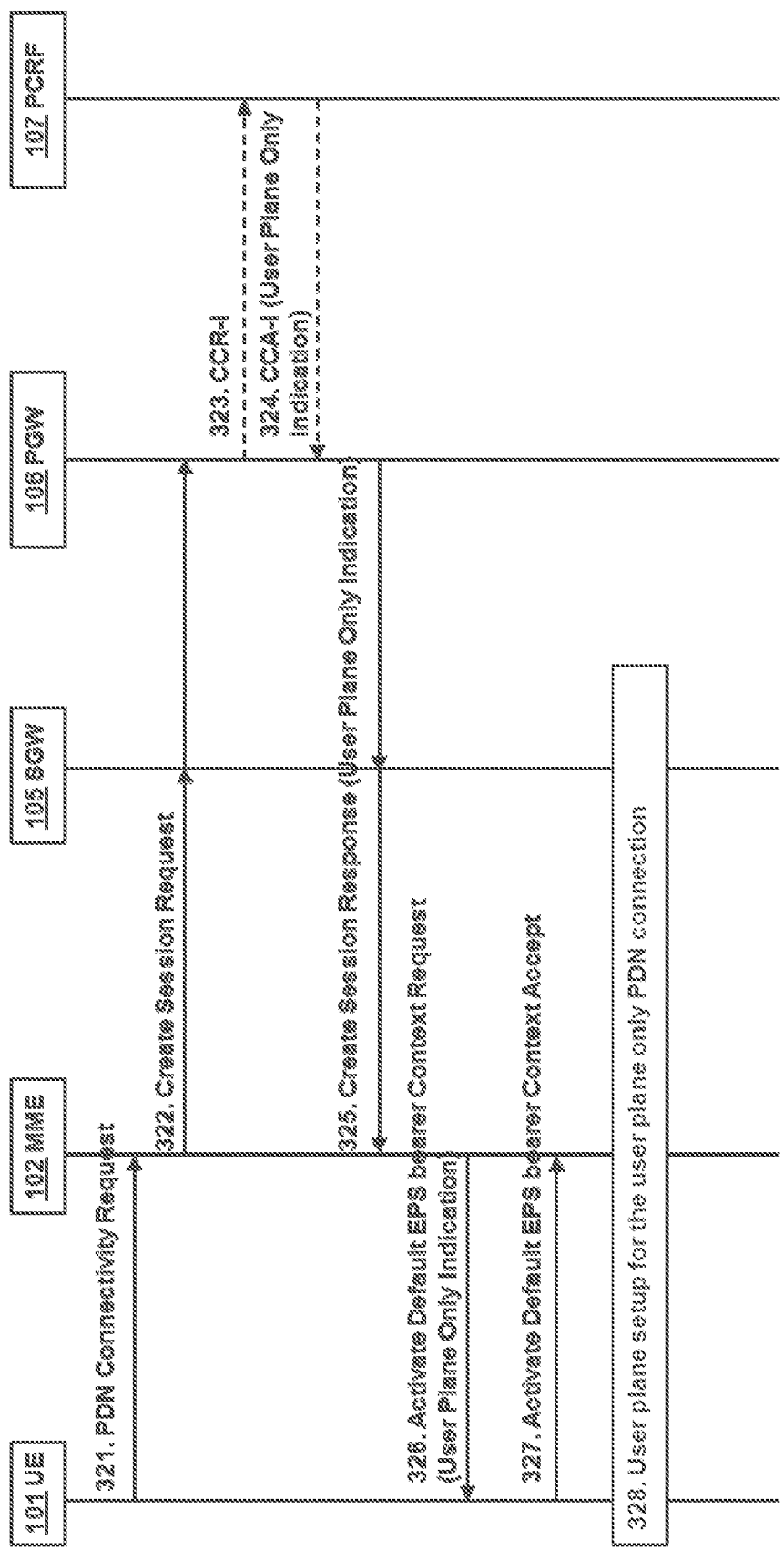
Figure 3C:
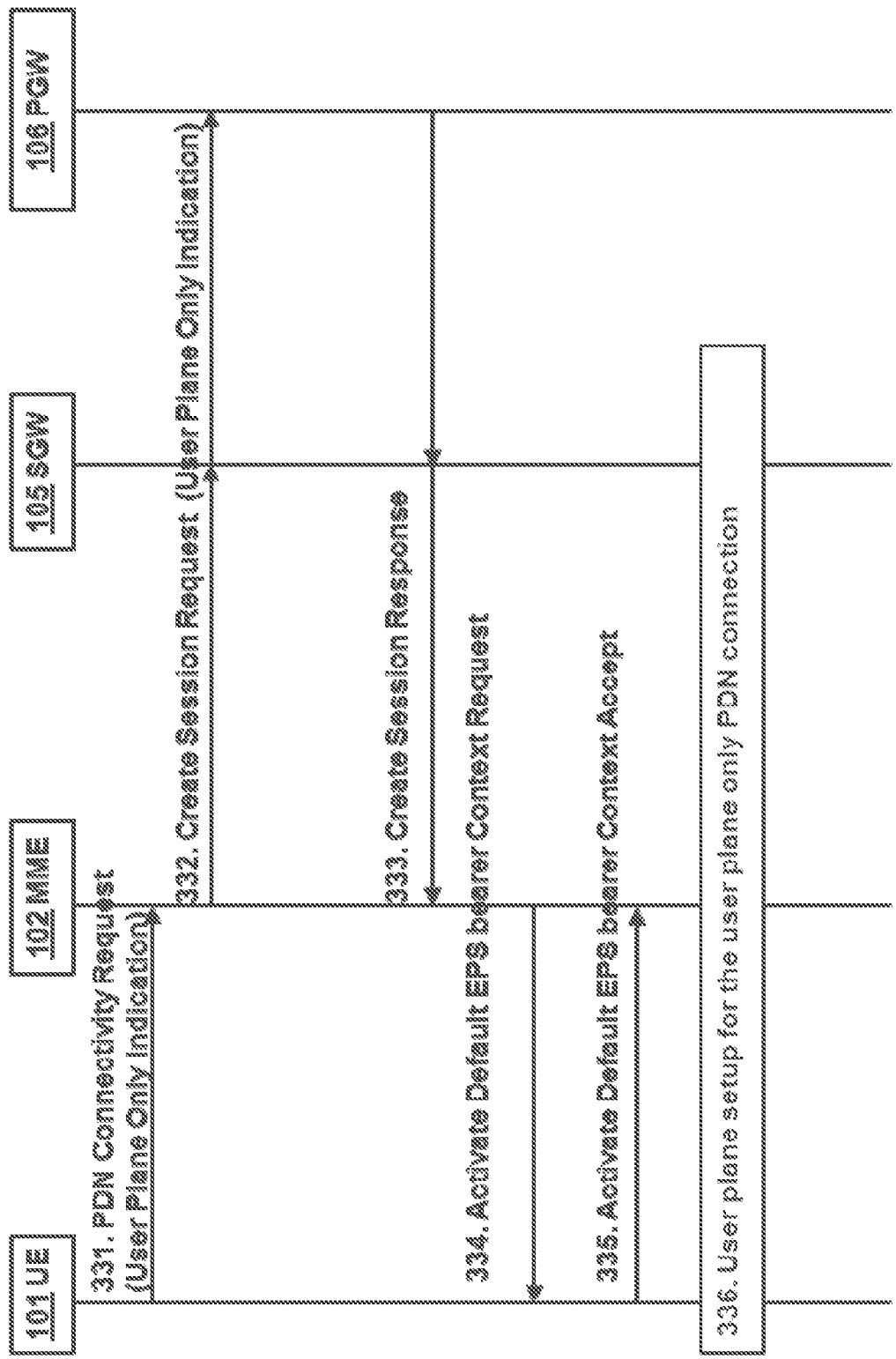

FIGS. 3A-3C are diagrams illustrating exemplary PDN connection establishment procedures according to some embodiments of the present disclosure. For simplicity, FIGS. 3A-3C only depict some exemplary network elements such as a UE 101, a MME 102, a HSS 104, a SGW 105, a PGW 106 and optionally a PCRF 107. It will be appreciated that signaling messages and network elements shown in FIGS. 3A-3C are just as examples, and more or less alternative signaling messages and network elements may be involved in the PDN connection establishment procedure.

According to the exemplary PDN connection establishment procedure illustrated in FIG. 3A, a user plane only indication for a PDN connection may be configured by the HSS 104, for example, as a part of subscriber data of the UE 101. As shown in FIG. 3A, the UE 101 may initiate the PDN connection establishment procedure by sending 311 a PDN connectivity request to the MME 102. In the case that the PDN connectivity request is a part of attach procedure (for example, the PDN connectivity request being an attach message with a PDN connectivity request) and the MME 102 does not have the subscriber data of the UE 101, the MME 102 may send 312 an update location request to the HSS 104 for retrieving the subscriber data which may comprise APN configuration information. The HSS 104 can send 313 an update location answer to the MME 102. In accordance with an exemplary embodiment, the user plane only indication may be included in the update location answer as the APN configuration information for any applicable APN.

Alternatively, the PDN connectivity request may be a standalone PDN connectivity request and the MME 102 may have got the subscriber data of the UE 101 during an attachment procedure for attaching the UE 101 to the associated APN. In this case, the MME 102 may have stored the subscriber data indicating that the associated APN is user plane only. When receiving the PDN connectivity request from the UE 101, the MME 102 can use the stored subscriber data comprising the user plane only indication to authorize the PDN connectivity request.

Figure 4:
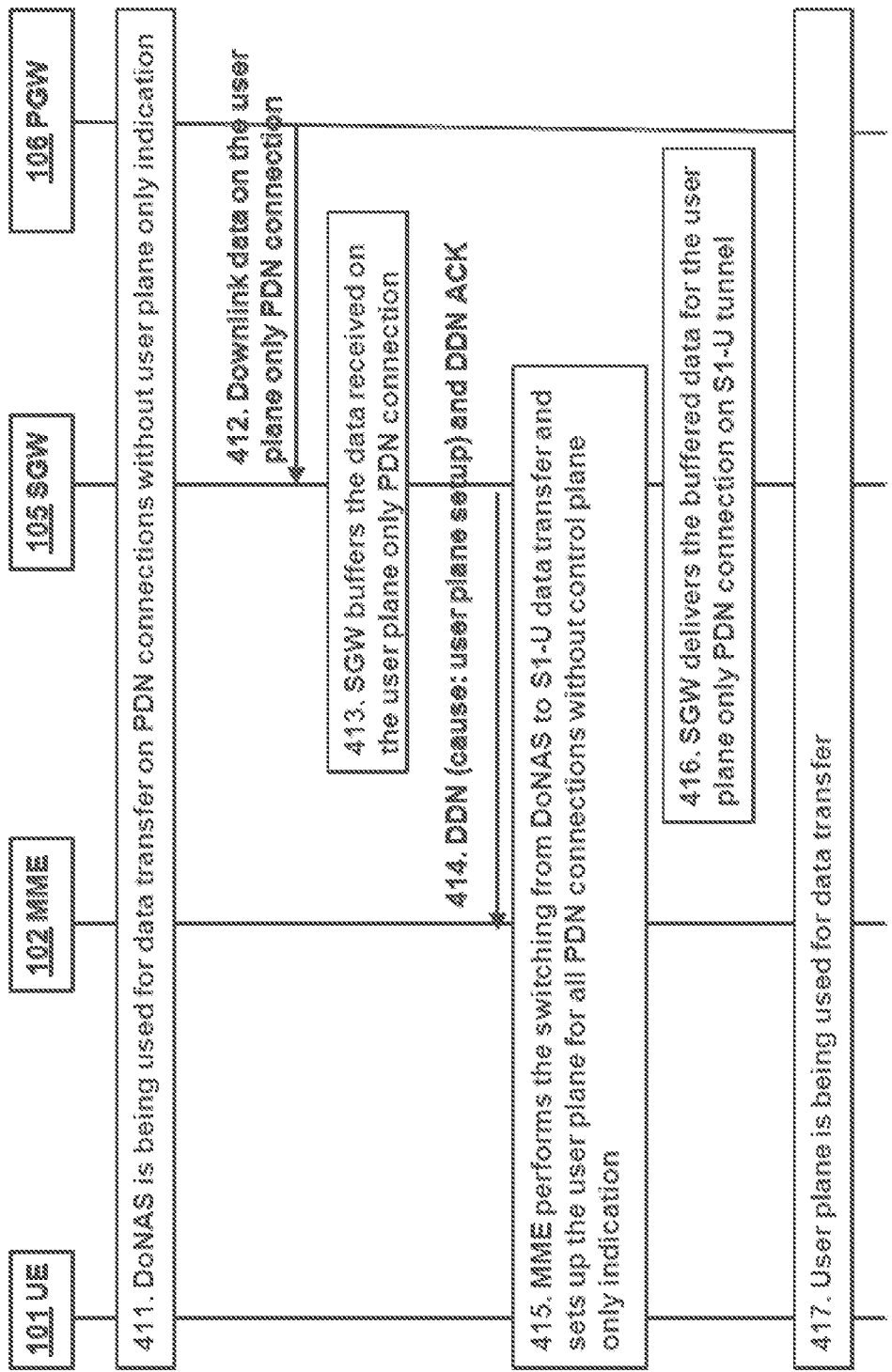
FIG. 4 is a diagram illustrating an exemplary downlink data handling procedure according to an embodiment of the present disclosure.

Based at least in part on the subscriber data, the MME 102 can know that the PDN connection may have to be user plane only. Then the MME 102 may include the user plane only indication in a create session request sent 314 to the SGW 105 and then to the PGW 106. The SGW 105 may store the user plane only indication for this PDN connection and use it for the downlink data handling (as illustrated in FIG. 4).

Corresponding to the create session request as shown in FIG. 3A, the PGW 106 may send 315 a create session response to the SGW 105 and then to the MME 102. Then the MME 102 may send 316 an activate default EPS bearer context request comprising the user plane only indication to the UE 101. The UE 101 can store the user plane only indication and send 317 an activate default EPS bearer context accept to the MME 102. In an embodiment, the user plane setup for the user plane only PDN connection may be performed 318 in parallel with operations 316 and 317.

According to the exemplary PDN connection establishment procedure illustrated in FIG. 3B, a user plane only indication for a PDN connection may be configured by the PGW 106 or the PCRF 107. As shown in FIG. 3B, the UE 101 may initiate the PDN connection establishment procedure by sending 321 a PDN connectivity request to the MME 102. Then the MME 102 may send 322 a create session request to the SGW 105 and then to the PGW 106.

In accordance with an exemplary embodiment, the PCRF 107 may be used for the APN to which this PDN connection is established. In this case, the PGW 106 may send 323 a credit control request-initial (CCR-I) message to the PCRF 107. Based at least in part on a local policy, the PCRF 107 may determine whether this PDN connection may have to be user plane only. If the PDN connection is determined as the user plane only PDN connection, the PCRF 107 may send 324 a credit control answer-initial (CCA-I) message comprising the user plane only indication to the PGW 106.

Alternatively or additionally, the PGW 106 may determine, based at least in part on its local policy, whether this PDN connection may have to be user plane only. If the PDN connection is user plane only, the PGW 106 can send 325 a create session response comprising the user plane only indication to the SGW 105 and then to the MME 102. The SGW 105 and the MME 102 may store the user plane only indication for handling data transfer on this PDN connection.

As shown in FIG. 3B, the MME 102 may send 326 an activate default EPS bearer context request comprising the user plane only indication to the UE 101. The UE 101 can store the user plane only indication and send 327 an activate default EPS bearer context accept to the MME 102. Similar to the case in FIG. 3A, the user plane setup for the user plane only PDN connection may be performed 328 in parallel with operations 326 and 327.

Optionally, the MME 102 also may know that the PDN connection may have to be user plane only, for example, according to the subscriber data previously obtained from the HSS 104, but not the create session response from the SGW 105. In this case, the MME 102 may provide the user plane only indication to the SGW 105 and then to the PGW 106 through the create session request. If the PGW 106 detects there is a confliction between the indication received from the MME 102 and the indication determined according to the local policy, the PGW 106 may reject the PDN connectivity request. Otherwise, the PGW 106 may accept the PDN connectivity request. In general, the user plane only PDN connection can coexist with PDN connections without a user plane only indication, but cannot coexist with any control plane only SGi PDN connection.

According to the exemplary PDN connection establishment procedure illustrated in FIG. 3C, a user plane only indication for a PDN connection may be configured by the UE 101. For example, based at least in part on local configuration data, the UE 101 may determine that certain APN is user plane only and then send the user plane only indication to the network side during a PDN connection establishment procedure. As shown in FIG. 3C, the UE 101 may initiate the PDN connection establishment procedure by sending 331 a PDN connectivity request comprising the user plane only indication to the MME 102. The user plane only indication may be sent 332 from the MME 102 to the SGW 105 and then to the PGW 106 in a create session request. Similar to the case as illustrated in FIG. 3A, the PGW 106 may send 333 a create session response to the SGW 105 and then to the MME 102.

Optionally, the PGW 106 may detect whether there is a confliction between the received indication and the locally determined indication, as illustrated in connection with FIG. 3B. If no conflict is detected, the PGW 106 may send 333 a create session response to the SGW 105 and then to the MME 102. The SGW 105 and the MME 102 may store the user plane only indication for handling data transfer on this PDN connection.

As shown in FIG. 3C, the MME 102 may send 334 an activate default EPS bearer context request (which may comprise the user plane only indication optionally) to the UE 101. The UE 101 can store the user plane only indication and send 335 an activate default EPS bearer context accept to the MME 102. Similar to the case as illustrated in FIG. 3A, the user plane setup for the user plane only PDN connection may be performed 336 in parallel with operations 334 and 335.

In accordance with an exemplary embodiment, after receiving the user plane only indication for the PDN connection, if there is any uplink data to be delivered on this PDN connection, the UE 101 may switch from DoNAS (if being used previously) to user plane data transfer before delivering the uplink data.

In accordance with an exemplary embodiment, the UE 101, the MME 102, the SGW 105 and/or the PGW 106 may store the user plane only indication for the PDN connection and use it for the downlink data handling (as illustrated in FIG. 4). It will be appreciated that the user plane only indication also may be used by the MME 102, the SGW 105 and/or the PGW 106 for other purpose such as charging.

FIG. 4 is a diagram illustrating an exemplary downlink data handling procedure according to an embodiment of the present disclosure. The network elements depicted in FIG. 4, such as a UE 101, a MME 102, a SGW 105 and a PGW 106, may enable a user plane only PDN connection to be established, for example, by performing the PDN connection establishment procedure as illustrated in FIG. 3A, FIG. 3B or FIG. 3C. During a certain time period, there may be no data being transferred on this PDN connection, while DoNAS is being used 411 for data transfer on other PDN connections without a user plane only indication, as shown in FIG. 4.

According to the exemplary downlink data handling procedure illustrated in FIG. 4, the SGW 105 may receive 412 downlink data on the user plane only PDN connection (which may be identified with a user plane only indication). Since the user plane only PDN connection can only delivery data over the user plane, the SGW 105 and the MME 102 may need some specific handling of the downlink data received on such PDN connection when DoNAS is previously being used for data transfer. In an embodiment, the SGW 105 may buffer 413 the downlink data received on the user plane only PDN connection although a S11-U tunnel is present. In this case, the SGW 105 may send 414 a DDN to the MME 102 and get a DDN acknowledgement (ACK). Optionally, the DDN may comprise a cause indicating that user plane setup is requested.

In accordance with an exemplary embodiment, the MME 102 can perform 415 the switching from DoNAS to S1-U data transfer and set up the user plane for all PDN connections without a control plane only indication (for example, all SGi based PDN connections), based at least in part on the cause in the DDN. Alternatively or additionally, the MME 102 can switch from control plane data transfer to user plane data transfer and perform the user plane setup for all PDN connections without a control plane only indication, according to the user plane only indication of the PDN connection corresponding to the EPS bearer identifier (EBI) in the DDN. In other words, based at least on the EBI in the DDN, the MME 102 also can determine that the corresponding PDN connection on which the data transfer is to be scheduled is user plane only and that the user plane setup is requested, although there may be no cause in the DDN to request the user plane setup.

In the case that the user plane has been established for the data transfer on the user plane only PDN connection, the SGW 105 may deliver 416 the buffered data for the user plane only PDN connection on the S1-U tunnel. Since the DDN may enable the user plane to be established for all PDN connections without the control plane only indication, all data transfer now may be performed on the user plane.

Figure 5:
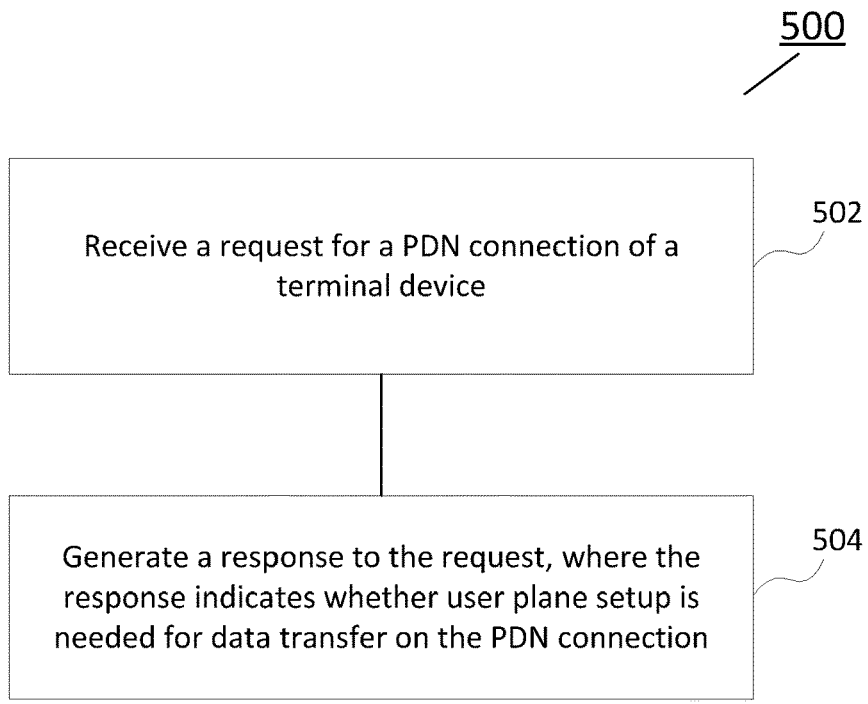
FIG. 5 is a flowchart illustrating a method according to some embodiments of the present disclosure.

FIG. 5 is a flowchart illustrating a method 500 according to some embodiments of the present disclosure. The method 500 illustrated in FIG. 5 may be performed by an apparatus implemented at a network node or communicatively coupled to a network node. In accordance with the exemplary embodiment, the network node may comprise a MME, a SGW, a PGW, a PCRF, or any other network device being capable of participating in communication of a wireless network.

Corresponding to operations of the exemplary method 200 as illustrated in FIG. 2, the network node in the exemplary method 500 as illustrated in FIG. 5 may receive a request for a PDN connection of a terminal device (such as a UE), as shown in block 502. In an exemplary embodiment, the network node may generate a response to the request, as shown in block 504. The response may indicate whether user plane setup is needed for data transfer on the PDN connection. In case that the PDN connection is a user plane only PDN connection, which may be identified with a user plane only indication, the response may indicate that the user plane setup is needed for the data transfer on the PDN connection.

In accordance with an exemplary embodiment, the user plane only indication may be located in the request for the PDN connection of the terminal device and configured by at least one of the terminal device (such as the UE 101), a mobility management entity (such as the MME 102) and a subscriber server (such the HSS 104). Alternatively or additionally, the user plane only indication may be located in the response to the request for the PDN connection and configured by at least one of a mobility management entity (such as the MME 102), a subscriber server (such the HSS 104), a session management entity (such as the PGW 106) and a policy function entity (such as the PCRF 107).

In an exemplary embodiment where the network node as described in connection with FIG. 5 may comprise a mobility management entity such as the MME 102, the request for the PDN connection of the terminal device such as the UE 101 may comprise a PDN connectivity request from the UE, and the response to the request may comprise an activate default EPS bearer context request from the MME. In this case, the user plane only indication for the PDN connection in the request may be configured by the UE 101. Alternatively, there may be no user plane only indication in the request for the PDN connection, while the user plane only indication configured by the MME 102, the HSS 104, the PGW 106 and/or the PCRF 107 may be located in the response to the request for the PDN connection.

In an exemplary embodiment where the network node as described in connection with FIG. 5 may comprise a session management entity such as the SGW 105, the request for the PDN connection of the terminal device may comprise a create session request from the MME 102, and the response to the request may comprise a create session response from the SGW. In this case, the user plane only indication for the PDN connection in the request may be configured by the UE 101, the MME 102 and/or the HSS 104. Alternatively, there may be no user plane only indication in the request for the PDN connection, while the user plane only indication for the PDN connection configured by the PGW 106 and/or the PCRF 107 may be located in the response to the request for the PDN connection.

In an exemplary embodiment where the network node as described in connection with FIG. 5 may comprise another session management entity such as the PGW 106, the request for the PDN connection of the terminal device may comprise a create session request from the SGW 105, and the response to the request may comprise a create session response from the PGW. In this case, the user plane only indication for the PDN connection in the request may be configured by the UE 101, the MME 102 and/or the HSS 104. Alternatively, there may be no user plane only indication in the request for the PDN connection, while the user plane only indication for the PDN connection configured by the PGW 106 and/or the PCRF 107 may be located in the response to the request for the PDN connection.

In an exemplary embodiment where the network node as described in connection with FIG. 5 may comprise a policy function entity such as the PCRF 107, the request for the PDN connection of the terminal device may comprise a CCR-I from the PGW 106, and the response to the request may comprise a CCA-I from the PCRF. In this case, the user plane only indication for the PDN connection in the request may be configured by the UE 101, the MME 102 and/or the HSS 104. Alternatively, there may be no user plane only indication in the request for the PDN connection, while the user plane only indication for the PDN connection configured by the PCRF 107 may be located in the response to the request for the PDN connection.

In accordance with an exemplary embodiment, the user plane only indication may be propagated to various nodes relevant to establishment of the PDN connection. Based at least in part on the user plane only indication for the PDN connection, the response to the request for the PDN connection may indicate that the user plane setup is needed for the data transfer on the PDN connection. Accordingly, the network node as described in connection with FIG. 5 may perform the user plane setup.

As mentioned previously with respect to FIG. 2, there may be no user plane data transfer on the established PDN connection during a certain time period. In this regard, the network node as described in connection with FIG. 5 may perform control plane data transfer, for example, by using DoNAS. In response to an event that user plane data transfer is to be scheduled on the PDN connection, the network node may switch from the control plane data transfer to the user plane data transfer.

In accordance with an exemplary embodiment, the event that the user plane data transfer is to be scheduled on the PDN connection may trigger a DDN for requesting user plane setup. The DDN may be transmitted from the network node such as the SGW 105 to the MME 102, so as to inform that the user plane is needed for the data transfer on the PDN connection. According to an exemplary embodiment, the network node such as the SGW 105 may receive the data to be transferred on the PDN connection, for example, from the PGW 106, and buffer the received data prior to switching from the control plane data transfer to the user plane data transfer. Upon setup of the user plane, the buffered data may be delivered from the SGW to the MME over the user plane.

Figure 6:
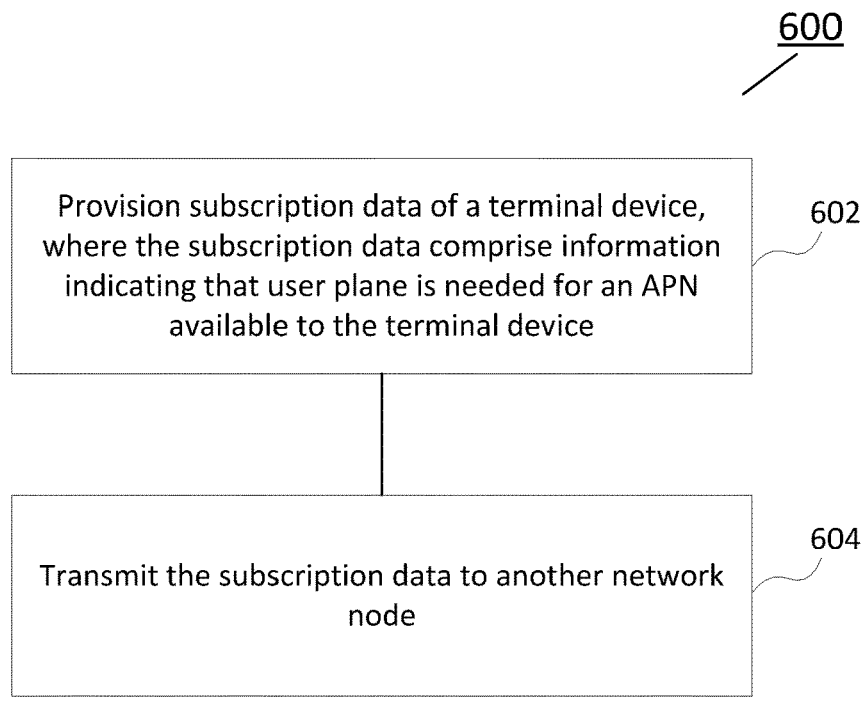
FIG. 6 is a flowchart illustrating a method according to some embodiments of the present disclosure.

FIG. 6 is a flowchart illustrating a method 600 according to some embodiments of the present disclosure. The method illustrated in FIG. 6 may be performed by an apparatus implemented at a network node or communicatively coupled to a network node. In accordance with the exemplary embodiment, the network node may comprise a HSS or any other network device being capable of participating in communication of a wireless network.

According to the exemplary method illustrated in FIG. 6, the network node (such as the HSS 104) can provision subscriber data of a terminal device (such as the UE 101), as shown in block 602. The subscriber data may comprise information indicating that user plane is needed for an APN available to the terminal device. Then the network node may transmit the subscriber data to another network node (such as the MME 102), as shown in block 604.

Figure 7:
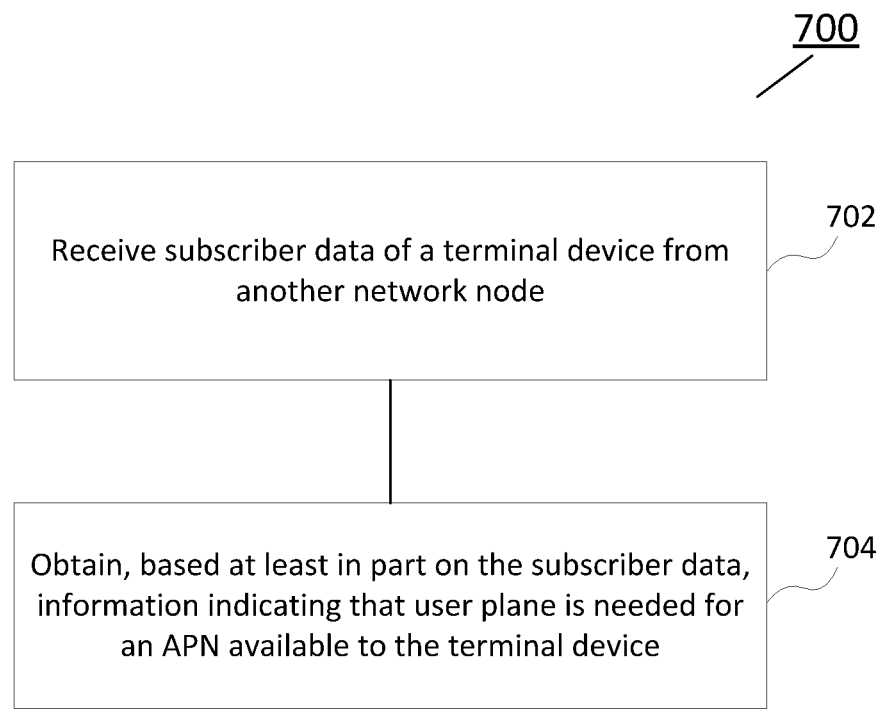
FIG. 7 is a flowchart illustrating a method according to some embodiments of the present disclosure.

FIG. 7 is a flowchart illustrating a method 700 according to some embodiments of the present disclosure. The method illustrated in FIG. 7 may be performed by an apparatus implemented at a network node or communicatively coupled to a network node. In accordance with the exemplary embodiment, the network node may comprise a MME or any other network device being capable of participating in communication of a wireless network.

Corresponding to operations of the exemplary method 600 as illustrated in FIG. 6, the network node (such as the MME 102) in the exemplary method 700 as illustrated in FIG. 7 may receive subscriber data of a terminal device from another network node (such as the HSS 104), as shown in block 702. Based at least in part on the subscriber data, the network node can obtain information indicating that user plane is needed for an APN available to the terminal device, as shown in block 704.

In accordance with an exemplary embodiment, the information indicating that the user plane is needed for the APN may comprise a user plane only indication as described in connection with FIGS. 2-5. According to an embodiment, in response to a request (such as an update location request) for subscriber data of a UE from the MME, for example, during an attach procedure, the HSS may transmit the subscriber data with the user plane only indication to the MME, for example, in an update location response. Alternatively, the subscriber data may be updated by the HSS, and then may be transmitted with the user plane only indication from the HSS to the MME, for example, during a subscriber data update procedure. It can be seen that the subscriber data of the UE may be provided to the MME by the HSS initiatively or as requested.

In accordance with an exemplary embodiment, the APN for which the user plane is needed may be associated with one or more PDN connections. Thus, the user plane only indication for the APN also may be used to determine that the associated PDN connections are user plane only. In other words, based at least in part on the subscriber data of the UE received from the HSS, the MME may know whether the PDN connection requested by the UE is a user plane only PDN connection. According to an exemplary embodiment, the MME may propagate the user plane only indication for the PDN connection to other nodes such as the UE 101 and the SGW 105.

The proposed solutions as illustrated with respect to FIGS. 1-7 can avoid the misusage of DoNAS for user plane only services such as IMS or equipment management services. According to some exemplary embodiments, a PDN connection may be configured as a user plane only PDN connection, for example, by a user plane only indication. The user plane only PDN connection can be used for certain operator service APN or other possible APN where the service may not be suitable to be delivered using DoNAS. In this way, the data delivery efficiency and the user service experience also may be improved.

The various blocks shown in FIGS. 2-7 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8:
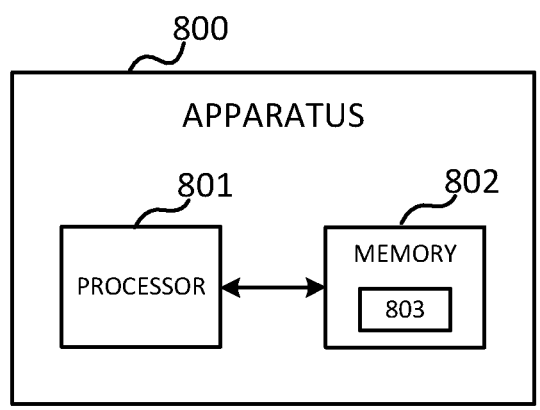
FIG. 8 is a block diagram illustrating an apparatus according to some embodiments of the present disclosure.

FIG. 8 is a block diagram illustrating an apparatus 800 according to some embodiments of the present disclosure. As shown in FIG. 8, the apparatus 800 may comprise one or more processors such as processor 801 and one or more memories such as memory 802 storing computer program codes 803. In accordance with some exemplary embodiments, the one or more memories 802 and the computer program codes 803 may be configured to, with the one or more processors 801, cause the apparatus 800 at least to perform any operation of the method as described in connection with any one of FIG. 2, FIG. 5, FIG. 6 and FIG. 7.

Alternatively or additionally, the one or more memories 802 and the computer program codes 803 may be configured to, with the one or more processors 801, cause the apparatus 800 at least to perform more or less operations to implement the proposed methods according to the exemplary embodiments of the present disclosure.

Figure 9:
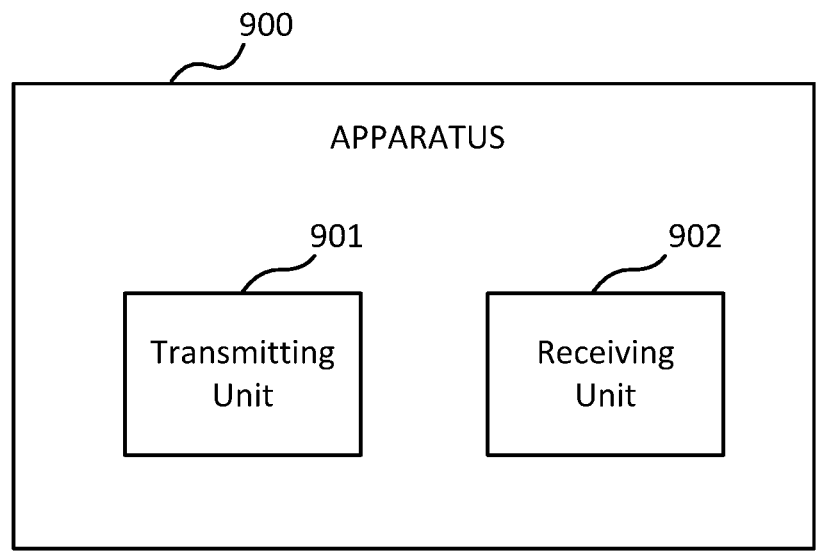
FIG. 9 is a block diagram illustrating an apparatus according to some embodiments of the present disclosure.

FIG. 9 is a block diagram illustrating an apparatus 900 according to some embodiments of the present disclosure. As shown in FIG. 9, the apparatus 900 may comprise a transmitting unit 901 and a receiving unit 902. In an exemplary embodiment, the apparatus 900 may be implemented at a terminal device such as a UE, a mobile station or the like. The transmitting unit 901 may be operable to carry out the operation in block 202, and the receiving unit 902 may be operable to carry out the operation in block 204. Optionally, the transmitting unit 901 and/or the receiving unit 902 may be operable to carry out more or less operations to implement the proposed methods according to the exemplary embodiments of the present disclosure.

Figure 10:
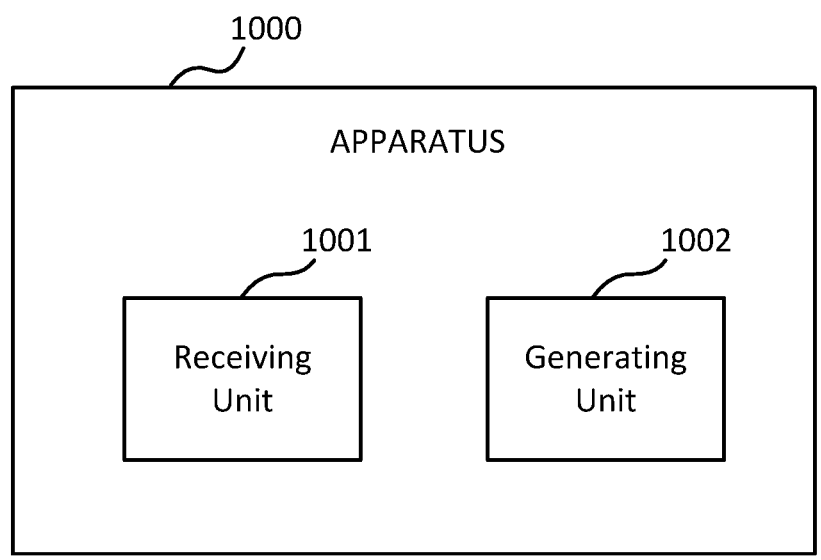
FIG. 10 is a block diagram illustrating an apparatus according to some embodiments of the present disclosure.

FIG. 10 is a block diagram illustrating an apparatus 1000 according to some embodiments of the present disclosure. As shown in FIG. 10, the apparatus 1000 may comprise a receiving unit 1001 and a generating unit 1002. In an exemplary embodiment, the apparatus 1000 may be implemented at a network node such as a MME, a SGW, a PGW, a PCRF, etc. The receiving unit 1001 may be operable to carry out the operation in block 502, and the generating unit 1002 may be operable to carry out the operation in block 504. Optionally, the receiving unit 1001 and/or the generating unit 1002 may be operable to carry out more or less operations to implement the proposed methods according to the exemplary embodiments of the present disclosure.

Figure 11:
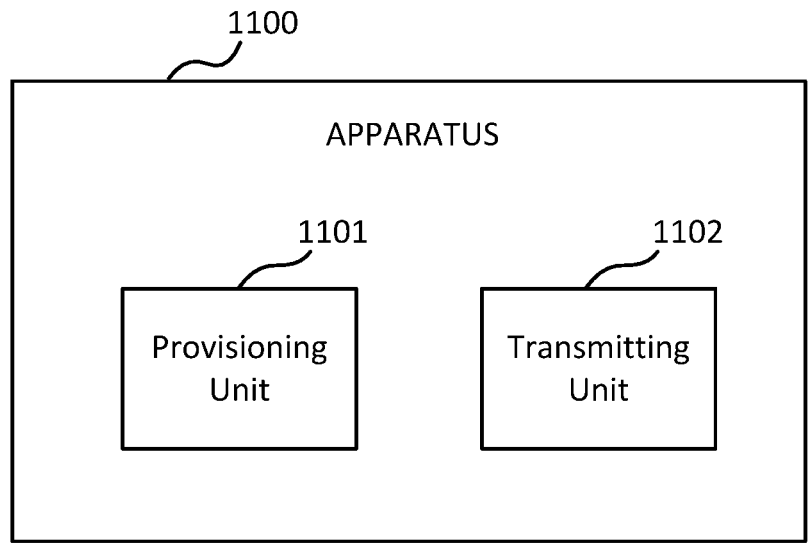
FIG. 11 is a block diagram illustrating an apparatus according to some embodiments of the present disclosure.

FIG. 11 is a block diagram illustrating an apparatus 1100 according to some embodiments of the present disclosure. As shown in FIG. 11, the apparatus 1100 may comprise a provisioning unit 1101 and a transmitting unit 1102. In an exemplary embodiment, the apparatus 1100 may be implemented at a network node such as a HSS or the like. The provisioning unit 1101 may be operable to carry out the operation in block 602, and the transmitting unit 1102 may be operable to carry out the operation in block 604. Optionally, the provisioning unit 1101 and/or the transmitting unit 1102 may be operable to carry out more or less operations to implement the proposed methods according to the exemplary embodiments of the present disclosure.

Figure 12:
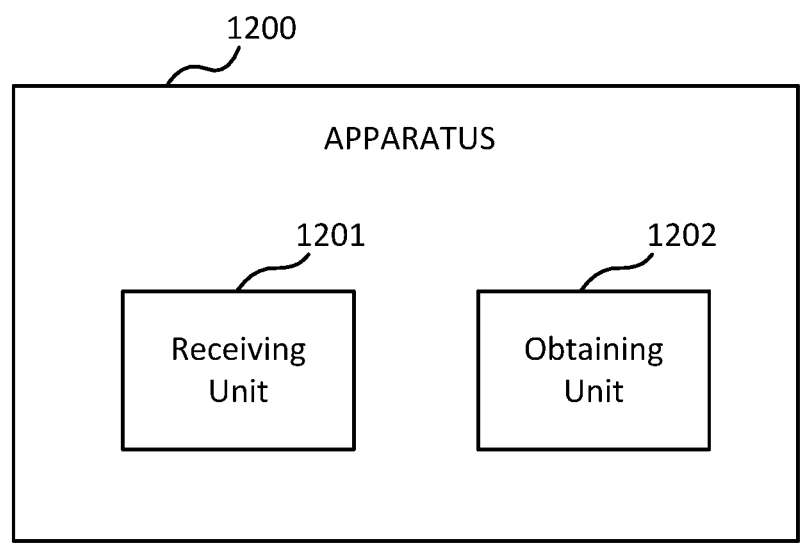
FIG. 12 is a block diagram illustrating an apparatus according to some embodiments of the present disclosure.

FIG. 12 is a block diagram illustrating an apparatus 1200 according to some embodiments of the present disclosure. As shown in FIG. 12, the apparatus 1200 may comprise a receiving unit 1201 and an obtaining unit 1202. In an exemplary embodiment, the apparatus 1200 may be implemented at a network node such as a MME or the like. The receiving unit 1201 may be operable to carry out the operation in block 702, and the obtaining unit 1202 may be operable to carry out the operation in block 704. Optionally, the receiving unit 1201 and/or the obtaining unit 1202 may be operable to carry out more or less operations to implement the proposed methods according to the exemplary embodiments of the present disclosure.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a terminal device, comprising:
transmitting a request for a packet data network connection of the terminal device to a network node, the request comprising a user plane only indication for the packet data network connection, and the user plane only indication being based on a local configuration; and
receiving a response to the request from the network node, wherein the response indicates whether user plane setup is needed for data transfer on the packet data network connection.

2. The method of claim 1, wherein the packet data network connection comprises a user plane only packet data network connection.

3. The method of claim 1, wherein the user plane only indication is configured by the terminal device.

4. The method of claim 1, wherein the response comprises a user plane only indication for the packet data network connection.

5. The method of claim 4, wherein the user plane only indication is configured by at least one of the network node, a subscriber server, a session management entity and a policy function entity.

6. The method of claim 1, wherein the user plane only indication is synchronized among the terminal device, the network node and one or more other network nodes involved in establishment of the packet data network connection.

7. The method of claim 1, further comprising:
performing the user plane setup, wherein the response indicates that the user plane setup is needed for the data transfer on the packet data network connection, based at least in part on a user plane only indication for the packet data network connection.

8. The method of claim 7, further comprising:
performing control plane data transfer; and
switching from the control plane data transfer to user plane data transfer, in response to an event that the user plane data transfer is to be scheduled on the packet data network connection.

9. The method of claim 8, wherein the event triggers a downlink data notification for requesting user plane setup.

10. An apparatus, comprising:
one or more processors; and
one or more memories comprising computer program codes,
the one or more memories and the computer program codes being configured to, with the one or more processors, cause the apparatus at least to:
transmit a request for a packet data network connection of the apparatus to a network node, the request comprising a user plane only indication for the packet data network connection, and the user plane only indication being based on a local configuration; and
receive a response to the request from the network node, wherein the response indicates whether user plane setup is needed for data transfer on the packet data network connection.

11. A method implemented at a network node, comprising:
receiving a request for a packet data network connection of a terminal device, the request comprising a user plane only indication for the packet data network connection, and the user plane only indication being based on a local configuration; and
generating a response to the request, wherein the response indicates whether user plane setup is needed for data transfer on the packet data network connection.

12. The method of claim 11, wherein the packet data network connection comprises a user plane only packet data network connection.

13. The method of claim 11, wherein the user plane only indication is configured by at least one of the terminal device, a mobility management entity and a subscriber server.

14. The method of claim 11, wherein the response comprises a user plane only indication for the packet data network connection.

15. The method of claim 14, wherein the user plane only indication is configured by at least one of a mobility management entity, a subscriber server, a session management entity and a policy function entity.

16. The method of claim 11, wherein the user plane only indication is synchronized among the terminal device, the network node and one or more other network nodes involved in establishment of the packet data network connection.

17. The method of claim 11, further comprising:
performing the user plane setup, wherein the response indicates that the user plane setup is needed for the data transfer on the packet data network connection, based at least in part on a user plane only indication for the packet data network connection.

18. The method of claim 17, further comprising:
performing control plane data transfer; and
switching from the control plane data transfer to user plane data transfer, in response to an event that the user plane data transfer is to be scheduled on the packet data network connection.

19. The method of claim 18, further comprising:
receiving data on the packet data network connection; and
buffering the received data prior to switching from the control plane data transfer to the user plane data transfer.

20. The method of claim 18, wherein the event triggers a downlink data notification for requesting user plane setup.

21. The method of claim 11, wherein the user plane only indication for the packet data network connection is forwarded from a mobility management entity to another mobility management entity during a mobility procedure.

22. An apparatus, comprising:
one or more processors; and
one or more memories comprising computer program codes,
the one or more memories and the computer program codes being configured to, with the one or more processors, cause the apparatus at least to:
receive a request for a packet data network connection of a terminal device, the request comprising a user plane only indication for the packet data network connection, and the user plane only indication being based on a local configuration; and
generate a response to the request, wherein the response indicates whether user plane setup is needed for data transfer on the packet data network connection.

* * * * *